(12) United States Patent
Perlick et al.

(10) Patent No.: US 6,575,282 B2
(45) Date of Patent: Jun. 10, 2003

(54) YAW DAMPER FOR A TWO WHEEL DRIVE MOTOR VEHICLE

(75) Inventors: Mark A. Perlick, Shelby Township, MI (US); Dan J. Showalter, Plymouth, MI (US); Roger J. Wood, Cortland, NY (US)

(73) Assignee: BorgWarner, Inc., Auburn Hills, MI (US)

(*) Notice: Subject to any disclaimer, the term of this patent is extended or adjusted under 35 U.S.C. 154(b) by 9 days.

(21) Appl. No.: 09/779,280

(22) Filed: Feb. 8, 2001

(65) Prior Publication Data

US 2003/0057049 A1 Mar. 27, 2003

Related U.S. Application Data

(60) Provisional application No. 60/181,662, filed on Feb. 10, 2000.

(51) Int. Cl.$^7$ .................. F16D 31/08; F16D 7/00; F16D 7/02
(52) U.S. Cl. .................. 192/56.6; 192/55.1; 192/56.3; 192/105 B; 464/46
(58) Field of Search ................. 192/55.1, 56.6, 192/105 B, 56.3, 58.2; 464/46; 303/140, 146; 701/88; 180/341, 252

(56) References Cited

U.S. PATENT DOCUMENTS

| | | | | |
|---|---|---|---|---|
| 2,659,220 A | * | 11/1953 | Cherry ........................ | 464/46 |
| 3,065,833 A | * | 11/1962 | Tiedeman et al. ...... | 192/105 B |
| 4,474,080 A | * | 10/1984 | Day .......................... | 192/56.6 |
| 4,659,040 A | * | 4/1987 | Sinclair .................. | 244/103 S |
| 4,690,258 A | * | 9/1987 | Teraoka et al. ......... | 192/105 B |
| 4,848,506 A | * | 7/1989 | Shimada et al. ........ | 192/105 B |
| 5,685,386 A | * | 11/1997 | Kondo et al. ............... | 303/146 |
| 5,687,808 A | * | 11/1997 | Watanabe et al. ........... | 180/242 |
| 5,722,305 A | * | 3/1998 | Sawa et al. .................... | 74/650 |
| 5,752,575 A | * | 5/1998 | Konishi et al. ............... | 180/76 |
| 5,941,334 A | * | 8/1999 | Inagaki ........................ | 180/242 |
| 6,033,040 A | * | 3/2000 | Inagaki et al. .............. | 303/140 |
| 6,123,398 A | * | 9/2000 | Arai et al. .................. | 303/140 |

* cited by examiner

Primary Examiner—Rodney H. Bonck
(74) Attorney, Agent, or Firm—Brinks Hofer Gilson & Lione

(57) ABSTRACT

A yaw damper for a front wheel drive vehicle provides torque transfer between the two non-driven wheels and generates a damping yaw moment in opposition to the current vehicle yaw condition. The yaw damper is passive and includes a mechanical clutch or fluid connection between the two non-driven wheels which transfer yaw correcting torque. The mechanical clutch includes first and second pluralities of interleaved friction disks which are coupled by shafts to respective non-driven wheels. A spring compresses the clutch pack and limits torque transfer between the shafts and wheels to a pre-selected maximum torque. In another embodiment, positive displacement pumps driven by each of the non-driven wheels are connected in series and transmit torque in proportion to the speed difference. In another embodiment, nested shafts include centrifugal clutches which transfer torque in proportion to vehicle speed and difference.

20 Claims, 5 Drawing Sheets

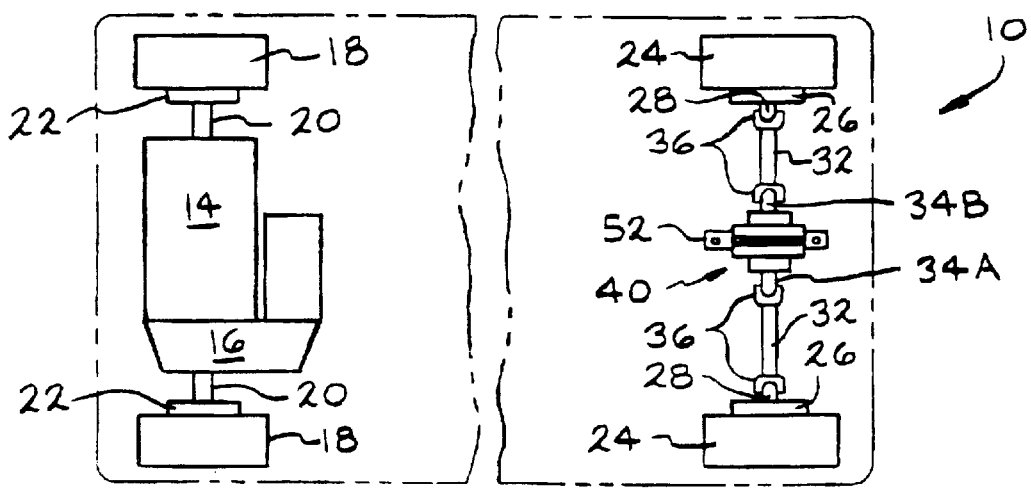
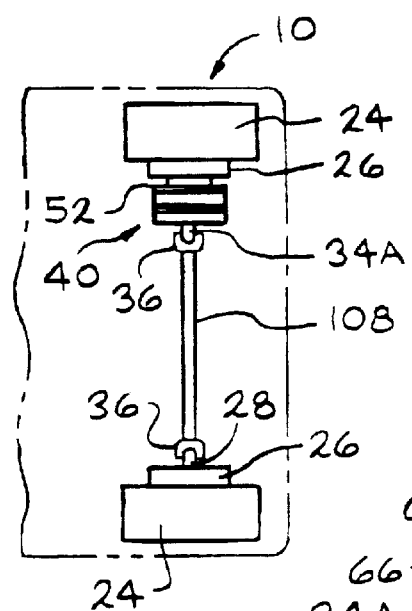
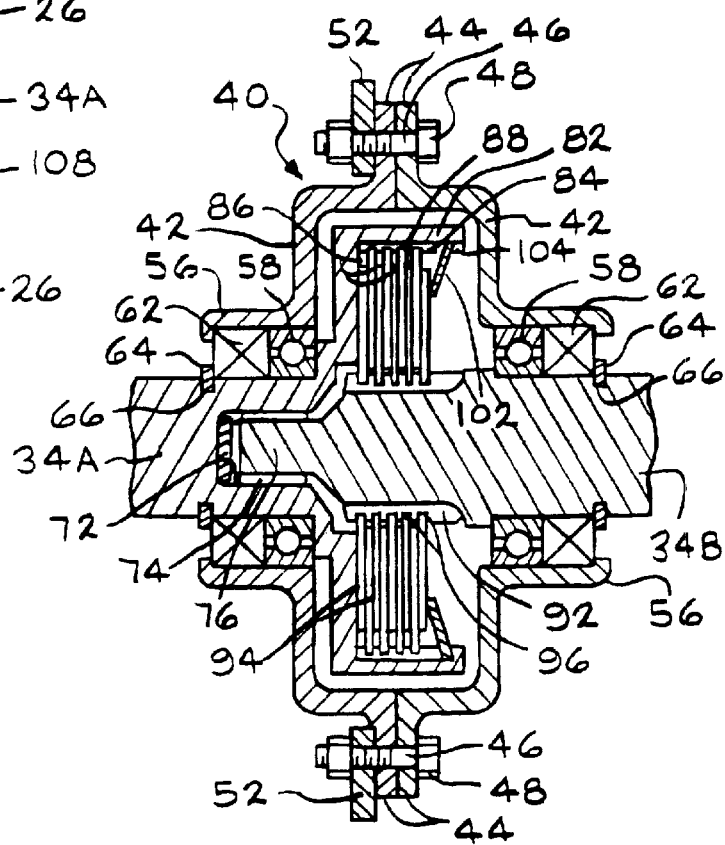
FIG. 1
FIG. 2
FIG. 3

YAW DAMPER FOR A TWO WHEEL DRIVE MOTOR VEHICLE

CROSS REFERENCE TO CO-PENDING PROVISIONAL APPLICATION

This non-provisional patent application filed Feb. 8, 2001 relates to co-pending, provisional patent application Serial No. 60/181,662 filed Feb. 10, 2000.

BACKGROUND OF THE INVENTION

The invention relates generally to a yaw damper for non-driven wheels of a two-wheel drive motor vehicle and more particularly to a yaw damper having a passive torque transfer device which is operably disposed between the non-driven wheels of a two wheel drive motor vehicle.

The benefits of front wheel drive in motor vehicles, particularly passenger cars and minivans, are generally recognized and acknowledged. Superior traction due to the weight of the engine being primarily borne by the front (driving) wheels improves traction on wet roads and in snow, ice and other low traction conditions. Front wheel drive configurations also tend to be space efficient and therefore are favored by both automobile manufacturers and users of compact and intermediate size vehicles.

Front wheel drive powertrains are not without some disadvantageous aspects, however. Front wheel drive vehicles are subject to torque steer which can be disconcerting to drivers unaccustomed to it. Front wheel drive vehicles also tend to be front heavy which can affect driving dynamics. Vehicle handling during a skid can be problematic if only because proper recovery from a skid in a front wheel drive vehicle requires counter-intuitive driver input. That is, if a front wheel drive vehicle begins to over steer or "come around," to straighten the vehicle, the driver must accelerate to pull the front out of the skid rather than let up on the throttle, a reaction which is appropriate for a rear wheel drive vehicle. Accordingly, while a front wheel drive vehicle may be more stable in low traction driving situations, once a skid or oversteer has commenced, correction may be more difficult for a typically skilled driver to achieve.

The present invention is directed to a device for improving stability and skid recovery of a front wheel drive vehicle.

SUMMARY OF THE INVENTION

A yaw damper for a two wheel drive vehicle provides torque transfer between the two non-driven wheels and generates a damping yaw moment in opposition to the current vehicle yaw moment. The yaw damper is passive and includes a mechanical clutch or pump and fluid connection between the two non-driven wheels which transfer yaw correcting torque. In one embodiment, the mechanical clutch includes first and second pluralities of interleaved friction disks which are coupled by shafts to respective non-driven wheels. A spring compresses the clutch pack and limits torque transfer between the shafts and wheels to a preselected maximum. The clutch may be disposed either in the center of the vehicle or adjacent one wheel. In another embodiment, positive displacement pumps driven by each of the non-driven wheels are connected in series and transmit torque in proportion to the speed difference. A pressure relief valve limits the maximum pressure in the fluid lines and thus the maximum torque transfer. In another embodiment, nested shafts include centrifugal clutches which transfer torque in proportion to the vehicle speed and the speed difference between the wheels. Mechanical stops limit maximum torque transfer between the wheels.

Thus it is an object of the present invention to provide a yaw damper coupled to the non-driven wheels of a two wheel drive vehicle.

It is a further object of the present invention to provide a yaw damper coupled to the rear wheels of a front wheel drive motor vehicle.

It is a still further object of the present invention to provide a passive yaw damper for the rear wheels of a front wheel drive vehicle which includes a friction clutch assembly.

It is a still further object of the present invention to provide a passive yaw damper for the rear wheels of a front wheel drive vehicle which includes interconnected fluid pumps driven by the rear wheels.

It is a still further object of the present invention to provide a passive yaw damper for the rear wheels of a front wheel drive vehicle which includes nested tubes having a torque limiting centrifugal clutch.

Further objects and advantages of the present invention will become apparent by reference to the following description of the preferred and alternate embodiments and appended drawings wherein like reference numbers refer to the same component, element or feature.

BRIEF DESCRIPTION OF THE DRAWINGS

FIG. 1 is a diagrammatic, plan view of a front wheel drive motor vehicle having a yaw damper according to the present invention disposed between non-driven wheels;

FIG. 2 is a diagrammatic, fragmentary, plan view of a portion of a front wheel drive motor vehicle with an alternate (offset) mounting for a yaw damper according to the present invention;

FIG. 3 is a full, sectional view of a yaw damper assembly according to the present invention having a friction clutch pack;

DESCRIPTION OF THE PREFERRED AND ALTERNATE EMBODIMENTS

Figure 4:
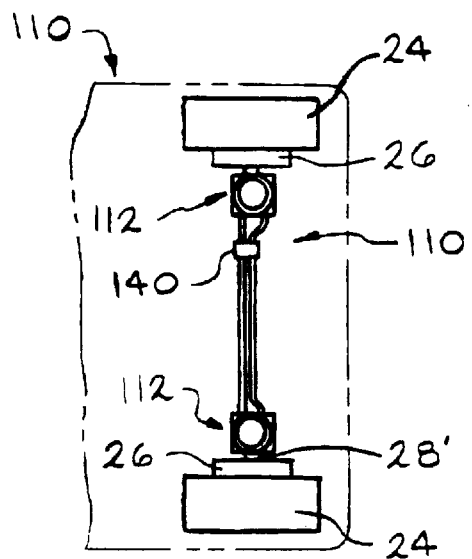
FIG. 4 is a diagrammatic, fragmentary, plan view of a front wheel drive motor vehicle having a hydraulic yaw damper according to a first alternate embodiment of the present invention.

Referring now to FIGS. 1 and 3, a front wheel drive motor vehicle incorporating the present invention is illustrated diagrammatically and designated by the reference number 10. The front wheel drive motor vehicle 10 includes a body or unibody 12 illustrated in phantom to which is secured a prime mover 14. The prime mover 14 drives a transaxle 16 which in turn drives a pair of front tire and wheel assemblies 18 through a pair of half shafts 20. A conventional disk or drum brake assembly 22 is associated with each of the front tire and wheel assemblies 18. At the rear of the vehicle 10 are disposed and rotatably supported a pair of rear tire and wheel assemblies 24 including conventional disk or drum brake assemblies 26. The rear tire and wheel assemblies 24 are coupled to a respective pair of first stub shafts 28, a respective pair of half shafts 32 and a second respective pair of stub shafts 34A and 34B by a plurality of constant velocity universal joints 36. The second pair of stub shafts 34A and 34B form a portion of a centrally mounted yaw damper assembly 40.

The yaw damper assembly 40 include a pair of generally symmetrical bell housings 42 which define peripheral flanges 44 which sealingly mate and include pluralities of aligned openings 46 which receive threaded fasteners 48 which may either simply secure the flanges 44 together or may extend through mounting ears, webs, flanges or other structures 52 associated with securing the damper assembly 40 to the motor vehicle 10. The bell housings 42 also define cylindrical regions 56 which support and secure anti-friction bearings such as a pair of ball bearing assemblies 58 as well as suitable oil seals 62. The ball bearing assemblies 58 and the oil seals 62 as well as other components are retained in their desired axial positions by cooperation between the oil seals 62 and a pair of snap rings 64 which seat within suitable channels 66 formed in the stub shafts 34A and 34B. The stub shaft 34A preferably includes a counterbore 72 which receives and supports a needle bearing assembly 74 which in turn rotatably supports and coaxially locates a reduced diameter portion 76 of the stub shaft 34B. The stub shaft 34A also includes a cylindrical or bell like portion 82 defining a plurality of axially extending internal or female splines or gear teeth 84. A first plurality of larger friction disks or plates 86 include external or male splines or teeth 88 about their outer peripheries which are complementary to and engage the splines 84 or the gear teeth on the bell like portion 82 of the first stub shaft 34A.

On a portion of the second stub shaft 34B adjacent the reduced diameter portion 76 are a plurality of male or external splines or gear teeth 92. A second plurality of smaller friction disks or plates 94 include internal or female splines or teeth 96 which are complementary to the male splines or gear teeth 92 on the second stub shaft 34B. The first and second pluralities of friction disks or plates 86 and 94 include suitable clutch or friction material on their faces and are interleaved and thus comprise a friction clutch pack capable of transferring torque between the first stub shaft 34A coupled to the left rear tire and wheel assembly 24 of the motor vehicle 10 and the second stub shaft 34B which is coupled to the right tire and wheel assembly 24. A Belleville spring or wave washer 102 is retained in force applying disposition adjacent the pluralities of interleaved clutch plates 86 and 94 by a shoulder or snap ring 104. The Belleville spring or wave washer 102 applies a preselected force to the pluralities of clutch disks or plates 86 and 94, thereby limiting the maximum torque throughput of the yaw damper assembly 40. That is, torque up to a certain limit will be transmitted through the yaw damper assembly 40 but torque above that limit will not be transmitted and slip between the stub shafts 34A and 34B will occur.

As illustrated in FIG. 1, the yaw damper assembly 40 may be disposed generally on the longitudinal center line of the vehicle 10 at the rear and elevated so that it is proximate the underside of the vehicle 10. The half shafts thus extend downwardly and outwardly from the yaw damper assembly 40. This location provides improved ground clearance. The central location also provides equal left-right weight distribution and may result in certain commonality of parts such as the half shafts 32.

An alternate mounting configuration for the yaw damper assembly 40 is illustrated in FIG. 2. Here the yaw damper assembly 40 is offset and disposed either adjacent or attached to the rear brake assembly 26 of one of the rear tire and wheel assemblies 24. So disposed, a single shaft 108 may be utilized to span the distance between the stub shaft 34A of the yaw damper assembly 40 and the stub shaft 28 and require only two constant velocity universal joints 36.

Figure 5:
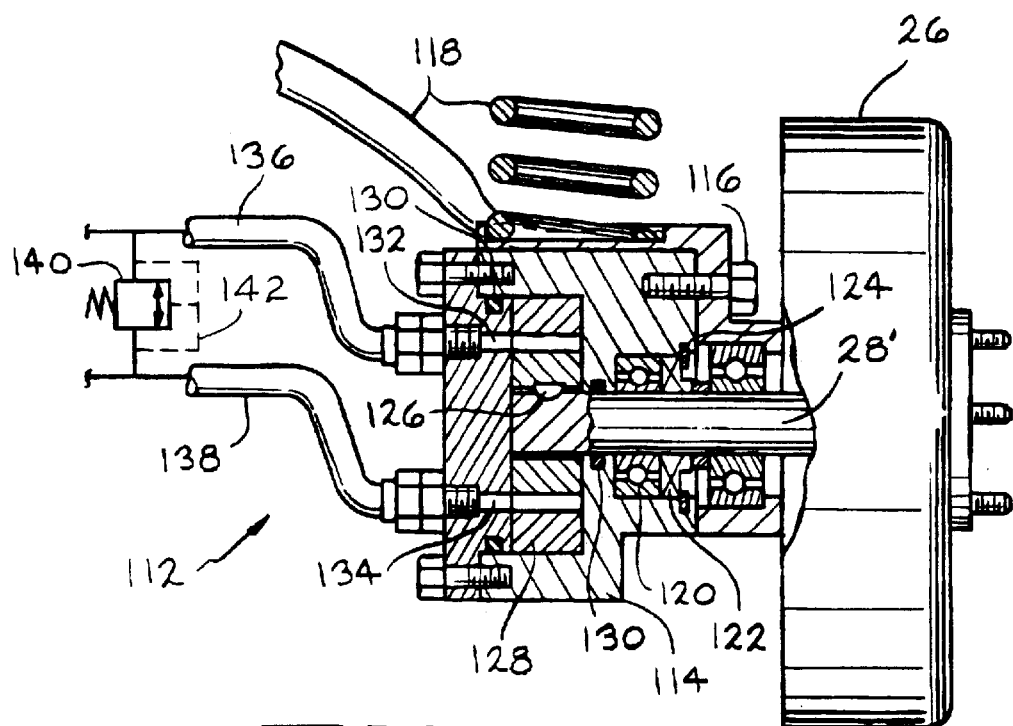
FIG. 5 is an elevational view in partial section of a first alternate embodiment hydraulic yaw damper according to the present invention.

Referring now to FIGS. 4 and 5, a first alternate embodiment yaw damper assembly 110 is illustrated. The yaw damper assembly 110 includes a pair of hydraulic (fluid) pumps 112, each of which is driven by the stub shafts 28' associated with the rear tire and wheel assemblies 24. Each of the fluid pump assemblies 112 are identical and, accordingly, only one of the hydraulic pumps 112 will be described in detail.

Each of the hydraulic pumps 112 includes a housing 114 which is secured by suitable fasteners such as bolts 116, one of which is illustrated in FIG. 5, to components of the rear wheel suspension 118. Alternatively, the housing 114 may be rugged enough to support components of the wheel suspension 118 itself. The housing 114 includes appropriately sized openings to receive an antifriction bearing such as a ball bearing assembly 120 and an appropriate oil seal 122 which provides a suitable fluid tight seal against the stub shaft 28'. A snap ring 124 retains the ball bearing assembly 120 and the oil seal 122 in the housing 114. Secured for rotation to the stub shaft 28' by a keyway 126, splines or other positive rotational coupling (not illustrated) is a positive displacement rotor 128. A pair of O-ring seals 130 seal the cavity in which the rotor 128 is disposed. The rotor 128 pumps fluid from an inlet port 132 to an outlet port 134 under pressure. The pump 112 may be a type commonly referred to as a gerotor pump, a gear pump or other type having positive displacement and which functions as both a pump and a motor. This latter requirement is important since during any given instant, one of the hydraulic pumps 112 may be rotating more rapidly than the other. Whichever is rotating more rapidly will function as a pump to drive the other hydraulic pump 112 and cause it to operate as a motor, thereby transferring torque from the faster rotating rear tire and wheel assembly 24 to the slower rotating rear tire and wheel assembly 24.

A pair of hydraulic lines 136 and 138 interconnect the inlet of one of the hydraulic pumps 112 to the outlet of the associated hydraulic pump 112 such that the two pumps are connected in series. The fluid displacement per rotation of each of the hydraulic pumps 112 should be carefully matched such that equal rotational travel of the stub shafts 28' and, of course, the rear tire and wheel assemblies 24 will result in equal quantities of hydraulic fluid being pumped by the respective hydraulic pumps 112 and thus that no torque or energy transfer will occur under conditions of equal wheel speed.

Disposed between the two hydraulic lines 136 and 138 and in fluid communication therewith is a pressure relief valve 140 which senses pressure through sensor lines 142. In order to avoid significant loss of pressure differential across the sensor lines 142, they may either include a small orifice which acts as a flow restrictor or may be independent and drive separate pistons and valve components in the relief valve 140. The pressure relief valve 140 senses the pressure in both of the hydraulic lines 136 and 138. When the difference in pressure between the two hydraulic lines 136 and 138 exceeds a predetermined maximum, the relief valve 140 opens and reduces the pressure until it is below the predetermined maximum. This pressure release function effectively limits the energy transferred between the two hydraulic pumps 112 in the hydraulic lines 136 and 138 and thus limits the torque transferred between the two rear tire and wheel assemblies 24 as will be further described subsequently.

Figure 6:
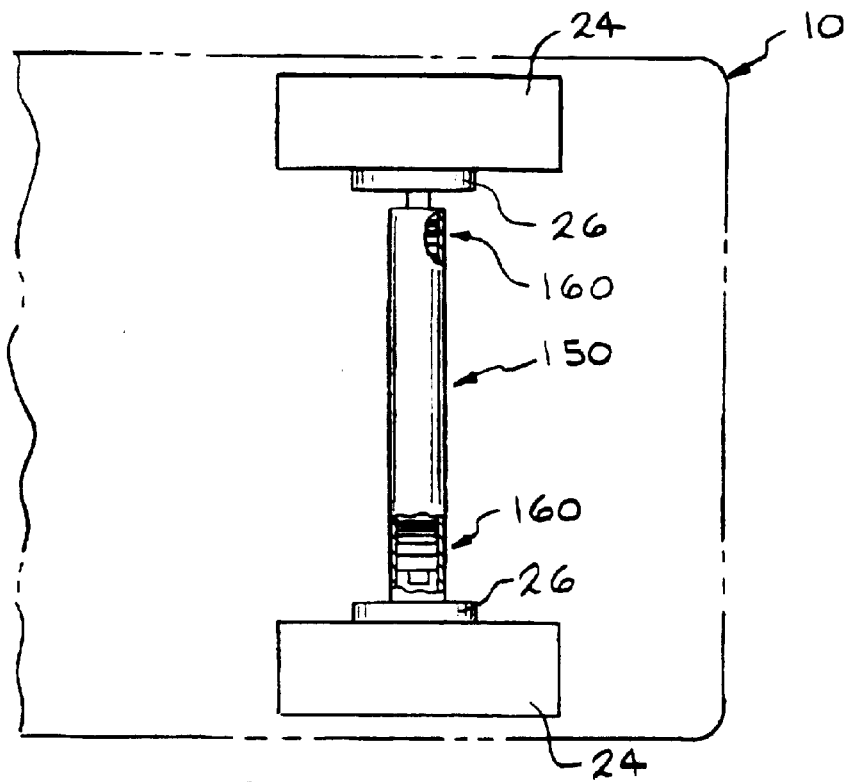
FIG. 6 is a diagrammatic, fragmentary, plan view of a front wheel drive motor vehicle having a yaw damper according to a second alternate embodiment of the present invention.
Figure 7:
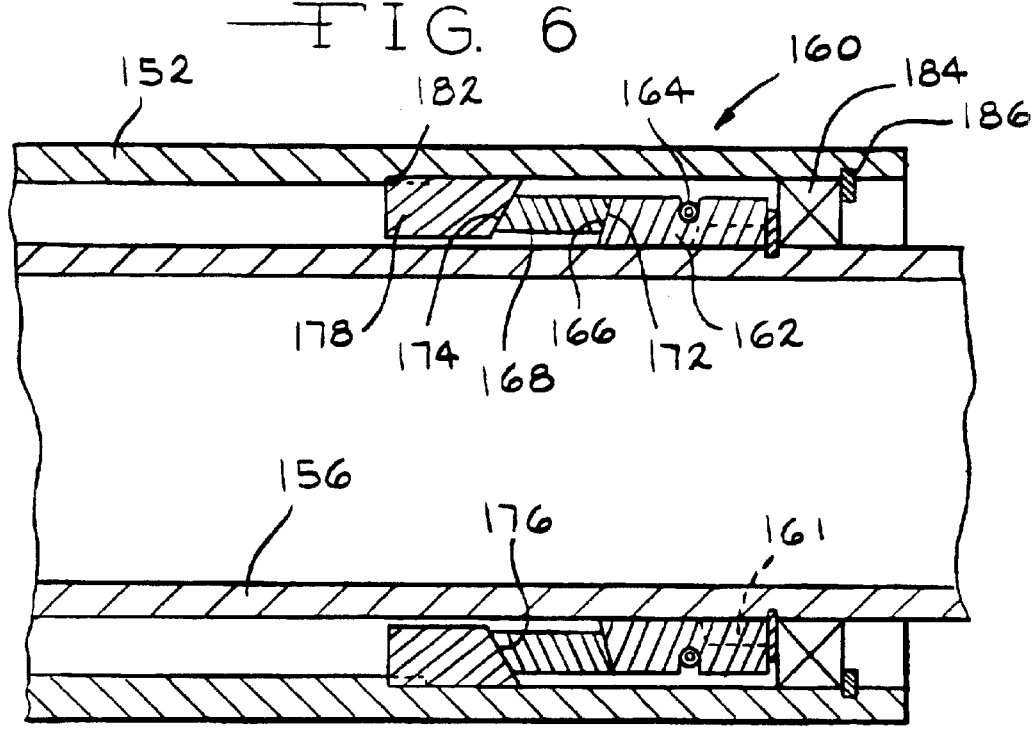
FIG. 7 is a fragmentary, sectional view of a centrifugal clutch assembly of a yaw damper according to a second alternate embodiment of the present invention.

Referring now to FIGS. 6 and 7, a second alternate embodiment yaw damper assembly is illustrated and designated by the reference number 150. In the second alternate embodiment yaw damper assembly 150, a first larger diameter, outer elongate tube 152 is secured for rotation with one, for example, the left, tire and wheel assembly 24. To the right tire and wheel assembly 24 is secured an inner or smaller cylindrical tube 156 such that it rotates therewith. Disposed between the inner surface of the outer elongate tube 152 and the outer surface of the inner elongate tube 156 at preferably at least two locations along their lengths are centrifugal clutch assemblies 160. The centrifugal clutch assemblies 160 include a plurality of spaced-apart weights 162 which are retained against the inner elongate tube 156 by one or more garter springs 164 and constrained to rotate therewith by ears or webs 161 extending from inner elongate tube 156. The centrifugal weights 162 each have end surfaces 166 defining a shallow angle of approximately ten to twenty degrees from the vertical. A plurality of intermediate transfer members 168 are disposed about the inner elongate tube 156 and include complementary first end surfaces 172 oriented at the same angle of between ten and twenty degrees which align with and engage the end surfaces 166 on the centrifugal weights 162. The transfer members 168 also include second oblique end surfaces 174 disposed at a relatively large angle of between forty and sixty degrees. The oblique end surfaces 174 are complementary to and engage oblique surfaces 176 on an aligned one of a plurality of clutch shoes 178. The clutch shoes 178 are secured to and rotate with the outer elongate tube 152. The clutch shoes 178 are maintained in a fixed axial position by a shoulder 182 in the outer elongate tube 152. A suitable oil seal seals 184 and protects the friction clutch assembly 160 from contamination and foreign material. The oil seal 184 is maintained in position by a suitable snap ring 186.

Figure 8:
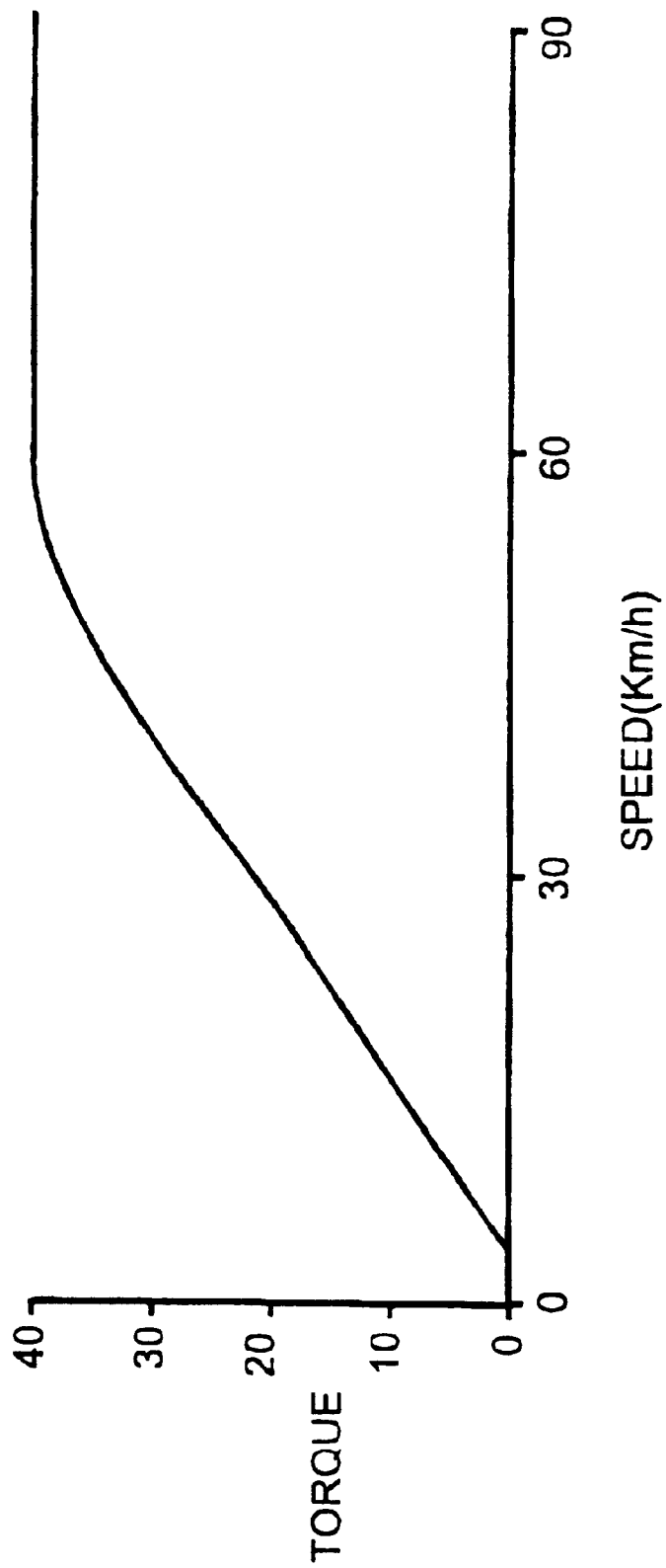
FIG. 8 is graph illustrating the performance, i.e., torque coupling, of a yaw damper according to the second alternate embodiment of the present invention.

Turning now to FIG. 8, a graph generally presenting the level of torque transfer as a function of speed of the second alternate embodiment yaw damper assembly 160 is illustrated. As the graph illustrates, as the speed of the vehicle 10 increases, the maximum torque transferable between the left and right rear tire and wheel assemblies 24 increases up to a maximum at which point the centrifugal weights 162 engage the inner surface of the outer elongate tube 152 and then provide no further increase in maximum torque transferability. It should be appreciated, however, that such torque is transferred only upon a speed difference between the rear tire and wheel assemblies 24 and if the tire and wheel assemblies 24 are rotating at the same speed, notwithstanding the frictional engagement provided by the assembly 160, no torque will be transferred. Moreover, at slow speeds such as encountered in parking lots and the like, the second alternate embodiment yaw damper assembly 160 will be substantially or completely disengaged regardless of the difference in speeds of the rear tire and wheel assemblies.

Figure 9:
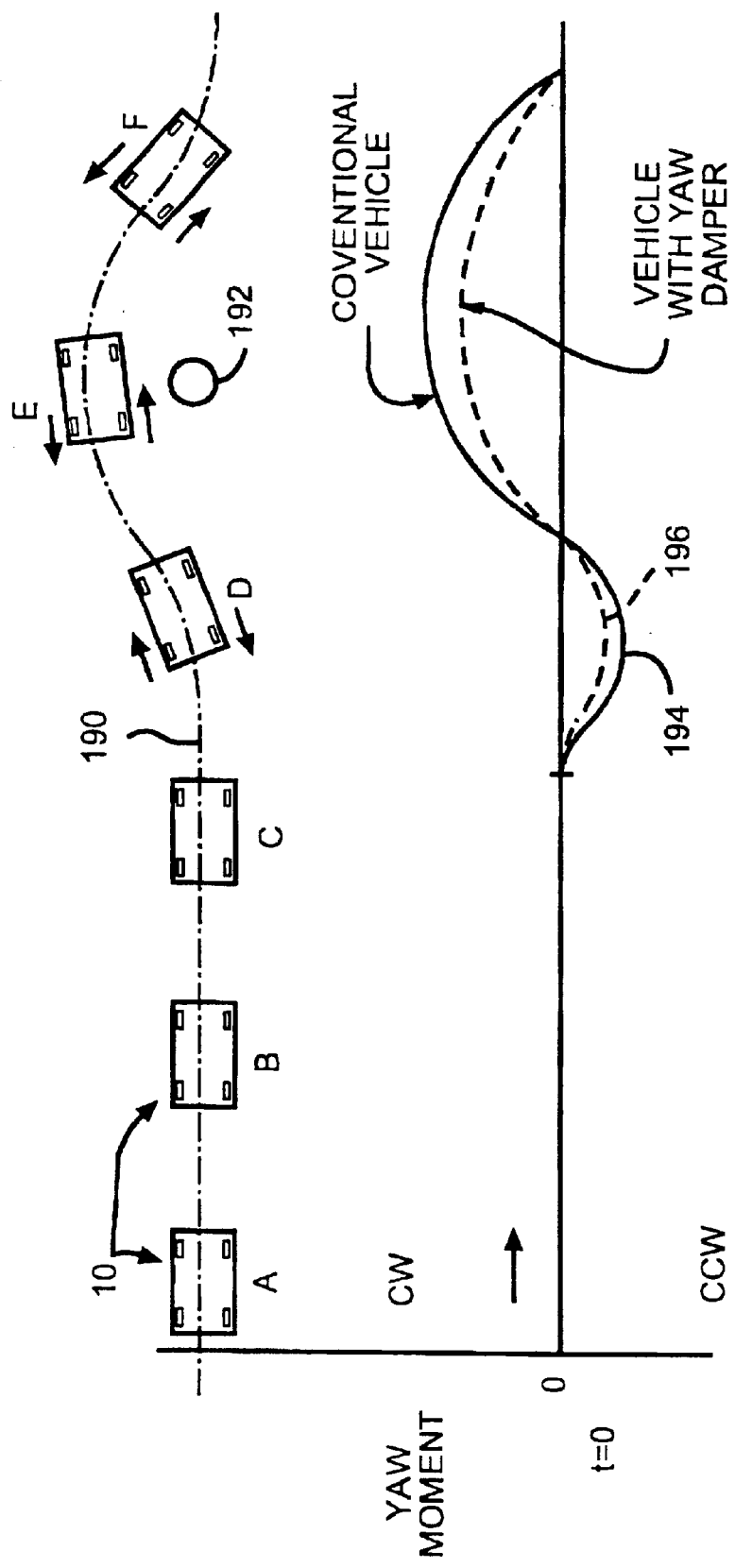
FIG. 9 is a diagrammatic view of a vehicle undergoing an emergency maneuver and a related graph illustrating the force moment (couple) of a front wheel drive vehicle.

Referring now to FIG. 9, a pair of diagrammatic graphs having a common horizontal timeline illustrate the performance and vehicle yaw counteracting forces generated by the yaw dampers of the present invention. A vehicle 10 incorporationg a yaw damper of either the preferred or alternate embodiments is illustrated translating along an initially straight path defined by the dashed line 190. During such translation, the vehicle 10 encounters an obstacle 192 in its path. At position C the driver begins an avoidance maneuver and steers the vehicle 10 to the left to avoid the obstacle 192.

At this time, as illustrated by the lower graph, a counterclockwise moment is created in the vehicle 10. The solid line 194 on the lower horizontal axis represent the magnitude of this unaltered counterclockwise moment. The smaller magnitude dashed line 196 represents the moment after it has been counteracted or opposed by the torque transferred through one of the yaw dampers of the present invention.

The action of the yaw dampers and the forces opposing the moment generated by turning of the vehicle 10 are illustrated by the arrows at position D which create a clockwise moment thus opposing the counterclockwise moment created by the evasive maneuver. As the vehicle straightens out, between positions D and E, both the moment generated by the turn as well as the moment generated by one of the yaw dampers of the present invention passes through zero.

Then, as the vehicle 10 is turned to the right to return to its straight path, a clockwise moment is generated and affects the vehicle 10. Again this condition is represented by the solid line of higher magnitude to the right in the lower graph in FIG. 9. A yaw damper according to one of the embodiments, of the present invention, however, reduces this moment or couple to the magnitude presented by the dashed line 196. The arrows at the rear of the vehicle in positions E and F represent the counterclockwise moment or restoring force generated by the yaw damper.

It should be appreciated that the yaw dampers according to the preferred or alternate embodiments of the present invention transfer only a limited amount of torque from left to right or right to left between the rear tire and wheel assemblies 24 to reduce but not eliminate the yaw moment at the rear of the vehicle. Stated somewhat differently, yaw dampers according to the present invention are not intended to equalize wheel speed but merely to tend or urge the rear wheels to a common speed. The torque thresholds and clutch sizes are all intentionally sized to be incapable of independently equalizing wheel speed. Viewed from the perspective of wheel slip, it would be clearly undesirable to size or design the yaw damper to transmit sufficient torque to generate wheel slip. Such activity could interfere with both wheel speed differentiation and anti-lock brake activity. Thus, maximum torque transfer in the range of from fifteen to thirty newton-meters is presently preferred. Given maximum values of certain design parameters, such torque values would be in the range of from ten to fifty newton-meters and higher. It should be appreciated that the precise numerical maximum torque transfer value will depend on many variables, primarily, the vehicle weight, the percentage of vehicle weight at the location of the yaw damper, vehicle horsepower, the desired degree of aggressiveness of the yaw damper system and other vehicle design and operating parameters.

The foregoing disclosure is the best mode devised by the inventors for practicing this invention. It is apparent, however, that devices incorporating modifications and variations will be obvius to one skilled in the art of vehicle drive and handling systems. Inasmuch as the foregoing disclosure is intended to enable one skilled in the pertinent art to practice the instant invention, it should not be construed to be limited thereby but should be construed to include such aforementioned obvious variations and be limited only by the spirit and scope of the following claims.

We claim:

1. A passive yaw damper for a two wheel drive motor vehicle comprising, in combination,
 a first member adapted to be driven by a first wheel,
 a second member adapted to be driven by a second wheel,
 an energy transfer assembly operably coupled to and provided with energy only from said first member and said second member, said energy transfer assembly transferring drive energy from a faster rotating one of said members to a slower rotating one of said members and limiting such drive energy transfer from said faster rotating member to said slower rotating member.

2. The yaw damper of claim 1 wherein said energy transfer assembly includes a multi-plate friction clutch and a resilient member which preloads said friction clutch.

3. The yaw damper of claim 1 wherein said energy transfer assembly includes a first plurality of clutch plates disposed for rotation with said first member and a second plurality of clutch plates interleaved with said first plurality of clutch plates and disposed for rotation with said second member.

4. The yaw damper of claim 1 wherein said energy transfer assembly includes a first hydraulic pump coupled to said first member and having first inlet and outlet ports and a second hydraulic pump coupled to said second member and having second inlet and outlet ports and means providing fluid communication between said first ports and second ports and a pressure relief valve disposed between said fluid communicating means.

5. The yaw damper of claim 1 wherein said first member includes a first cylinder and said second member includes a second cylinder disposed coaxially with said first cylinder and said transfer assembly including a plurality of centrifugal clutch segments disposed between said first and said second cylinders.

6. The yaw damper of claim 1 wherein said energy transfer assembly is attached to a portion of a vehicle body.

7. The yaw damper of claim 1 wherein said energy transfer assembly transfers no more than 50 newton-meters of torque.

8. A clutch assembly disposed between non-driven wheels of a motor vehicle comprising, in combination,
 a first member operably coupled to a first wheel,
 a second member operably coupled to a second wheel,
 a passive torque transfer device operably disposed between said first member and said second member for transferring torque from a faster rotating one of said first and second members to a slower rotating one of said first and second members, only said first and said second members providing operating energy to said torque transfer device, and
 a torque limiter for limiting torque transfer from said faster rotating member to said slower rotating member.

9. The clutch assembly of claim 8 wherein said transfer device is a multi-plate friction clutch and said limiter is a resilient member who preloads said friction clutch.

10. The clutch assembly of claim 8 wherein said transfer device includes a first plurality of clutch plates disposed for rotation with said first member and a second plurality of clutch plates interleaved with said first plurality of clutch plates and disposed for rotation with said second member.

11. The clutch assembly of claim 8 wherein said transfer device includes a first hydraulic pump coupled to said first member and having first inlet and outlet ports and a second hydraulic pump coupled to said second member and having second inlet and outlet ports and means providing fluid communication between said first ports and second ports and wherein said limiter includes a pressure relief valve disposed between said fluid communicating means.

12. The clutch assembly of claim 8 wherein said first member defines a first elongate cylinder and said second member defines a second elongate cylinder disposed coaxially with said first cylinder and further including a plurality of centrifugal clutch segments disposed between said first and said second cylinders.

13. The clutch assembly of claim 8 wherein said torque transfer device is attached to a portion of a vehicle body.

14. The clutch assembly of claim 8 wherein said torque transfer device transfers no more than 50 newton meters of torque.

15. A passive yaw damper for disposition between non-driven wheels of a two wheel drive motor vehicle comprising, in combination,
 a first member adapted to be coupled to a first wheel,
 a second member adapted to be coupled to a second wheel, and
 torque transfer means operably disposed between said first member and said second member and provided with energy only from said members for transferring torque from a faster rotating one of said first and second members to a slower rotating one of said first and second members and means for limiting torque transfer between said members to no more than a pre-selected value.

16. The yaw damper of claim 15 wherein said torque transfer means is a multi-plate friction clutch and said limiting means is a resilient member which preloads said friction clutch.

17. The yaw damper of claim 15 wherein said torque transfer means includes a first plurality of clutch plates disposed for rotation with said first member and a second plurality of clutch plates interleaved with said first plurality of clutch plates and disposed for rotation with said second member.

18. The yaw damper of claim 15 wherein said torque transfer means includes a first hydraulic pump coupled to said first member and having first inlet and outlet ports and a second hydraulic pump coupled to said second member and having second inlet and outlet ports and means providing fluid communication between said first ports and second ports and wherein said limiting means includes a pressure relief valve disposed between said fluid communicating means.

19. The yaw damper of claim 15 wherein said first member includes a first cylinder and said second member includes a second cylinder disposed coaxially with said first cylinder and said torque transfer means includes a plurality of centrifugal clutch segments disposed between said first and said second cylinders.

20. The yaw damper of claim 15 wherein said pre-selected valve is less than 50 newton-meters.

* * * * *